Oct. 4, 1927.
Re. 16,761
M. LOUGHEAD
BRAKING APPARATUS
Original Filed Dec. 17, 1920
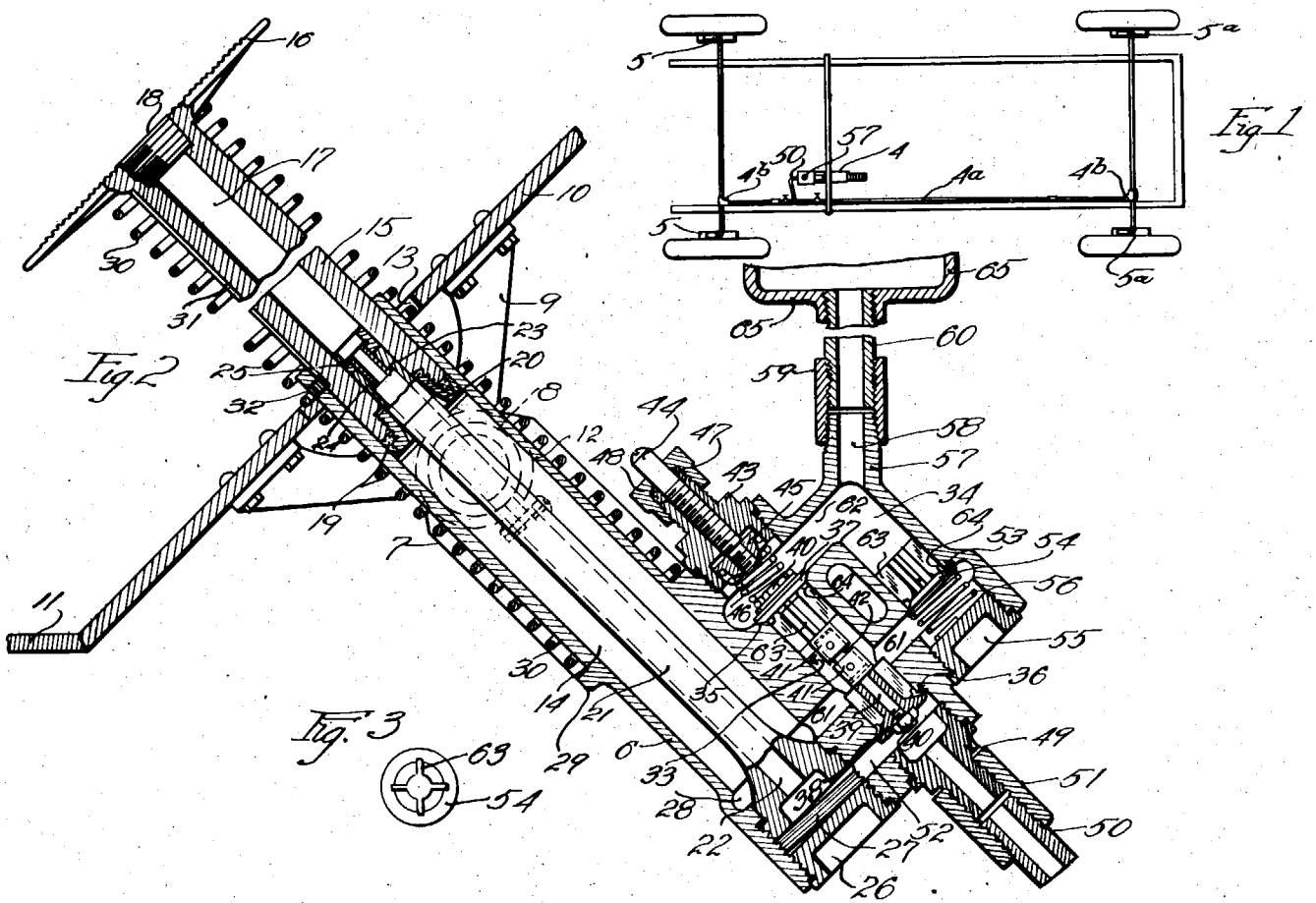
INVENTOR
Malcolm Loughead
Williams, Bradbury, McCaleb and Hinkle,
ATTORNEY Reissued Oct. 4, 1927.

Re. 16,761

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

BRAKING APPARATUS.

Original No. 1,495,231, dated May 27, 1924, Serial No. 431,334, filed December 17, 1920. Application for reissue filed March 28, 1925. Serial No. 19,180.

My invention relates to braking apparatus of the fluid-operated type for automobiles and similar vehicles, and is concerned especially with improvements in a fluid compression device adapted for use in connection with apparatus of the kind mentioned which is operated by a foot pedal or other means for supplying fluid under pressure to the brake operating mechanism.

One of the objects of the present invention resides in the provision of pressure producing mechanism of the character described by means of which the fluid column is manipulated throughout the braking operation, without causing a suction in the system which might effect the introduction of air bubbles at leaks occurring in the line, which would seriously impair the general effectiveness of the pressure mechanism.

Another object of my invention consists in the provision of a mechanism of the character described, which comprises a fluid reservoir for relieving any suction which may be produced in the system, and for compensating for leakage at joints throughout the system whereby a constant supply of operating fluid is maintained in the system.

A still further object resides in the provision of an improved compression device wherein simultaneously operable high and low pressure producing means are provided.

A still further object resides in the provision of means controlled by the pressure in the system for disassociating the low pressure producing means from the system.

The foregoing and other objects of the present invention will appear as the following detailed description progresses, in which reference is made to the accompanying drawing, wherein Figure 1 is a skeleton plan of a braking system of the character described applied to an automobile, in connection with which my improved fluid compression device is adapted to operate.

Figure 2 is a longitudinal vertical section of the device of my invention, the parts thereof being illustrated in their respective normal inoperative positions, and Figure 3 is an isolated end view of the re-filling valve forming an element of the device shown in Figure 2.

The same reference numerals designate the same parts throughout the views.

Referring to the drawing, the compression device of my invention is designated generally by the reference numeral 4, and is adapted to operate a pair of braking mechanisms 5—5, on the forward steering wheels, and a similar pair of braking mechanisms $5^a$—$5^a$ on the rear wheels of the automobile. These braking mechanisms may be of any appropriate construction but preferably are of the character disclosed in my application Serial No. 431,332, filed December 17, 1920, which has matured into Patent No. 1,460,-163, June 26, 1923. The device has communication with both of the pairs of mechanisms through a piping system indicated generally by the reference numeral $4^a$. The system $4^a$, it will be noted, comprises a single pipe running the length of the chassis which supplies the communicating branches at the front and rear of the chassis, preferably through swivel connections shown at $4^b$—$4^b$. While these connections may be of any suitable design and construction, I prefer to provide connections as illustrated in my application, Serial No. 431,335, filed of even date herewith.

Referring now particularly to Figure 2, it will be noted that my improved compression device comprises a main casting 6, having an upwardly extending bracket 7, formed integral therewith. Provided near the upper end of the bracket is an integral, laterally projecting lug 8, which is securely held in a clamping collar provided on the bracket 9. The bracket 9 is bolted or otherwise supported conveniently on the nether side of the toe board 10, which, as illustrated, extends at an angle of substantially 45° to the floor 11. While the device is illustrated as tilted at an angle of substantially 45° to the floor 11, and at right angles to the toe board 10, it will, of course, be apparent that this inclination is adjustable as desired by means of the clamping collar provided on the bracket 9.

The cylinder 12 forming a part of the main casting 6 extends upwardly in spaced parallel relation to the bracket 7 through a hole 13 in the toe board 10. The bore 14 of the cylinder 12 is open at its upper end, and slidably receives a piston 15, which projects a substantial distance above the toe board 10, and is provided at its outer end with a suitable foot pedal 16. The piston 15 is provided with a concentric bore 17, which is closed at its upper end at the pedal 16 by means of a plug 18, and at its lower end has a downwardly working cup leather 19, secured thereto by means of a suitable bushing 20.

Slidable in the bore 17, and co-axial with the piston 15, which I shall hereinafter refer to as "the low pressure piston" is a second piston 21, which will hereinafter be referred to as "the high pressure piston".

The piston 21 is fixed in relation to the cylinder 12 and is provided with a longitudinal concentric bore 22, the upper end of which is slightly reduced to provide a shoulder 23. Secured to this end of the piston 21, by means of a ring 24, is an upwardly working cup leather 25. The ends of the ring 24 are flanged as shown to engage at one end the shoulder 23, and at the other end the cup leather 25. The piston 21 is enlarged at its lower end as shown, and is threaded into the lower end of the bore 14 of the cylinder 12. A plug 26 closes the lower end of the bore 14 slightly beneath the lower end of the piston 21, to provide a substantial chamber 27, with which the bore 22 communicates. The lower end of the cylinder bore 14 is enlarged as shown to provide a chamber 28 above the enlarged lower end of the piston 21.

A shoulder 29 is provided on the cylinder 12 and a tension spring 30 surrounds the cylinder 12 and piston 15, and lies between the shoulder 29, and the pedal 16, tending to urge the piston 15 outwardly from the cylinder 12. A longitudinal slot 31 provided in the outer wall of the piston 15 co-operates with a set screw 32 to limit the reciprocal movement of the piston within the cylinder 12.

Formed integral with the casting 6 and parallel to the cylinder 12 are the cylinders 33 and 34. Provided adjacent the ends of the cylinder 33 are the valve seats 35 and 36, with which are arranged to co-operate valves 37 and 38, respectively. The valves 37 and 38 are provided with stems 39 which are threaded at their outer ends to receive nuts 40 whereby the stems are secured to the valves. The opposite enlarged bifurcated ends 41 of the stems 39 are joined by means of a link 42 as shown. It will be seen that the valves 37 and 38 are so coupled that when one of them is seated, the other is open. The open end of the cylinder 33 is closed by a threaded plug 43. An adjusting screw 44 extends through the plug 43, and carries on its inner end a collar 45, to properly tension the spring 46, which urges the valve 37 to its seat. To prevent leakage of fluid under pressure past the screw 44, packing material 47 is provided which may be suitably compressed by a nut 48.

The opposite end of the cylinder 33 is provided with a nipple 49 with which the outlet pipe 50 is connected by means of a union 51. The pipe 50 may be joined with the pressure responsive means of the brake operating mechanism in any desired manner but preferably as disclosed in my application, Serial No. 431,332 above mentioned. A transverse passage 52 establishes communication between the chamber 27 and the cylinder 33 below the valve 38 and with the pipe 50.

Provided adjacent the lower open end of the cylinder 34 is a valve seat 53 with which co-operates a valve 54 which will hereinafter be referred to as "the refilling valve". The open end of the cylinder 34 is closed by a threaded plug 55. A tension spring 56 is disposed between the plug 55 and the valve 54, tending to hold the latter to its seat.

The end of the cylinder 34 opposite the plug 55 is provided with an externally threaded stem 57 which is provided with a central bore 58 opening into the cylinder 34. Connected to the stem 57 by means of a union 59 is a pipe 60 which extends upwardly to a fluid reservoir 65 which may be located upon the rear of the instrument board or any other convenient place. The interior of the reservoir is subject to atmospheric pressure.

A passage 61 extends transversely in the casting 6, over the passage 52 and parallel therewith, and establishes communication between the chamber 28 at the lower end of the cylinder 12 and the cylinder 33 between valves 37 and 38, and the cylinder 34, beneath the refilling valve 54. Another passage 62 joins the cylinders 33 and 34 at their upper ends.

In order to permit easy steady movement of the valves 37, 38 and 54 within their respective cylinders, and in order not to unduly impede the passage of fluid thereby, I preferably form these valves with fluted portions 63, beneath the heads as most clearly seen in Figure 3, and as a further precaution I provide openings as shown at 64, between the webs of the fluted portion 63, adjacent the valve head.

Before proceeding to a description of the operation of the mechanism just described, it may be noted that the spring 46 which tends to force the valve 37 to its seat, has preferably a tension sufficient to resist a pressure of approximately 20 pounds per square inch. However, the spring tension may be widely varied to accommodate given conditions. The spring 56 is very light, having sufficient tension merely to hold the valve 55 to its seat.

The entire device is, of course, completely filled with the operating fluid which is preferably a non-compressible oil or alcohol although a compressible fluid as air may be utilized. The fluid reservoir 65 previously mentioned is filled almost completely periodically, to compensate for the loss of oil throughout the system, due to leakage, evaporation, etc.

When the parts are in their respective normal inoperative positions, the piston 15 is substantially withdrawn from the cylinder 12, and the valves 37 and 54 are closed; the valve 38, however, being open. Pressure upon the pedal 16, communicated thereto by the operator's foot, depresses the piston 15, which causes a flow of oil from the space about the piston 21 through passage 61, past the valve 38, into the pipe 50, and, simultaneously from the bore 17 through passage 52, also into the pipe 50. Continued depression of the pedal 16 causes the flow of oil along this circuit until all of the slack is taken up in the brake bands by the brake operating mechanism above referred to. I have found that at this point the pressure in the system has reached approximately 20 pounds. The moment this pressure is attained, and depression of the pedal 16 is continued, the valve 37 is unseated against the tension of the spring 46. Simultaneously, with the opening of valve 37, the valve 38 is closed. The space above the valve 37 is connected to the reservoir 65 which is subjected to atmospheric pressure. The fluid under pressure in the cylinder 33 rushes past the head of the valve, thereby urging the same upwardly and assisting the valve 38 to seat quickly. Furthermore, the pressure beneath the valve 38, assists the very prompt closing of this valve and holds it closed as long as the pressure is maintained. As the depression of the pedal 16 is continued, a very great increase of pressure in the system results, since the same is subject solely to the pressure produced by the high pressure piston, the bore of which, it will be noted, is very small, to permit a broader range of movement of the pedal and at the same time to permit of a greater range of production of pressure in the system. Simultaneously with the production of the high pressure in the pipe 50 by the high pressure piston, the low pressure piston is causing a flow of oil through the passage 61 past the valve 37 through passage 62 into cylinder 34, out through the pipe 60 and upwardly into the fluid reservoir 65. By the time the low pressure piston reaches the vicinity of the chamber 28, the pressure existing in the system produced by the high pressure piston is very high, so high, in fact, that I have found I am enabled to stop a vehicle in a much shorter distance than it has heretofore been possible. When it is desired to relieve the braking pressure in the system, the operator simply removes his foot from the pedal 16. As there is no measurable amount of compression in the fluid in the system, it is necessary to provide spring means at various points to insure the easy and rapid return of the parts to their respective normal inoperative positions. In this connection the spring 30 is provided to urge the pedal 16 outwardly. A rather considerable head is produced by the fluid which has been forced into the fluid reservoir by the low pressure piston, as above described. As the low pressure piston recedes, this fluid is returned to the system through the refilling valve 54 which is, unseated by the greater pressure existing on the upper side thereof. When the pressure in the system has been reduced to approximately 20 pounds per square inch, the valve 37 will be urged to its seat, thereby opening the valve 38. As the low pressure piston recedes further, fluid passing through the passage 61 past the valve 38 and passage 52 into the chamber 27 and thence into the bore 22 completely fills the opening in the bore 17 above the high pressure piston. In a like manner, fluid passing the valve 38 into the passage 61 and past the refilling valve 54 into passage 61 and thence into the bore 14 of the cylinder 12 completely fills the annular space beneath the low pressure piston. The parts are, in this manner, permitted to return to their normal inoperative positions; the refilling valve 54 being urged to its seat by the spring 56, the moment a difference of pressure no longer exists on opposite sides of this valve.

In the foregoing description, I have made use of the terms "inner," "outer," "upper," "lower" etc. which, it must be understood, are used merely in their relative sense and not in their specific sense.

While I have described the details of the preferred embodiment of my invention, I do not limit myself to these specific details, but claim further all adaptations and modifications coming within the spirit and scope of the appended claims.

What I claim is:

1. In a braking system for vehicles, brake members, a fluid pressure system, means responsive to the pressure therein for operating said brake members, and means for creating pressure in said system comprising a high pressure producing means, a low pressure producing means, an outlet for the fluid under pressure to said system, and means automatically actuated upon the fluid being subjected to a predetermined pressure for closing communication between said outlet and said low pressure producing means.

2. In a braking system for vehicles, brake members, a fluid pressure system, means responsive to the pressure therein for operating said brake members, means for providing fluid under pressure, an outlet for the fluid under pressure, said pressure providing means comprising a high pressure producing means ontinually in communication with said outlet, a low pressure producing means normally in communication with said outlet, a valve for closing the communication between said low pressure producing means and said outlet, and means actuated incident to subjecting said fluid to a predetermined pressure for moving said valve to closed position.

3. In a braking system for vehicles, brake members, a fluid pressure system, means responsive to the pressure therein for operating said brake members, means for providing fluid under pressure, an outlet for the fluid under pressure, said pressure providing means comprising a high pressure producing means arranged to force a small volume of fluid into said outlet under high pressure, a low pressure producing means arranged to force a large volume of fluid into said system under low pressure, said high and low pressure producing means being arranged to both force fluid into said outlet upon initial operation, and means operable at a predetermined pressure produced in said outlet for closing communication between said outlet and said low pressure producing means.

4. In a braking system for vehicles, brake members, a fluid pressure system, means responsive to the pressure therein for operating said brake members, and means for creating pressure in said system comprising a high pressure producing means, a low pressure producing means, an outlet for the fluid under pressure, said low pressure producing means being normally in communication with said outlet, said high and low pressure producing means being arranged upon initial operation to both force fluid into said outlet, and valves operable at a predetermined pressure produced in said outlet for closing communication between said outlet and said low pressure producing means, but maintaining communication between said high pressure producing means and said outlet.

5. In a braking system for vehicles, brake members, a fluid pressure system, means responsive to the pressure therein for operating said brake members, means for providing fluid under pressure, an outlet for the fluid under pressure, said pressure providing means comprising means for initially injecting a large volume of fluid into said outlet under low pressure, means operable only at a predetermined pressure produced in said outlet for closing communication between said outlet and said means for initially injecting, and means for thereafter injecting a small volume of fluid into said outlet under a high pressure.

6. In a braking system for vehicles, brake members, a fluid pressure system, means responsive to the pressure therein for operating said brake members, means for providing fluid under pressure, an outlet for said fluid under pressure, said pressure providing means comprising a high pressure producing means arranged for forcing a large volume of fluid into said outlet under a high pressure, a low pressure producing means arranged to force a relatively large volume of fluid into said outlet under a comparatively low pressure, a fluid reservoir, said high and low pressure producing means being arranged upon initial operation to both force fluid into said outlet, means operated by a predetermined pressure produced in said outlet for closing communication between said outlet and said low pressure producing means and placing said low pressure producing means in communication with said fluid reservoir, whereby said high pressure producing means is alone maintained in communication with said outlet, and means operable upon reduction of pressure in said outlet for providing communication between said reservoir and said high and low pressure producing means whereby fluid from said reservoir is caused to reenter the pressure producing means.

7. In a braking system for vehicles, brake members, a fluid pressure system, means responsive to the pressure therein for operating said brake members, and means for creating pressure in said system comprising a high pressure producing means, a low pressure producing means, an outlet for the fluid under pressure, said high and low pressure producing means being arranged upon initial operation to both force fluid into said outlet, a fluid reservoir, and means actuated by a predetermined pressure in said outlet for closing communication between said low pressure producing means and said outlet and opening communication between said low pressure producing means and said fluid reservoir.

8. In a braking system for vehicles, brake members, a fluid pressure system, means responsive to the pressure therein for operating said brake members, means for providing a fluid under pressure, an outlet for the fluid under pressure, said pressure providing means comprising a high pressure cylinder arranged to have constant communication with said outlet, a low pressure cylinder arranged to normally have communication with said outlet, pistons in said cylinders, a fluid reservoir, means for causing relative movement of said pistons and cylinders, means, operable at a predetermined pressure produced in said system for opening communication between said fluid reservoir and said low pressure cylinder and for closing communication therebetween and said outlet, comprising a pair of valves so connected that when one is seated, the other is off its seat, said valves being also operated by a predetermined difference in pressure between the fluid reservoir and said outlet to establish communication between said reservoir and said high and low pressure cylinders for replenishing the supply of fluid in said cylinders after operation.

9. In a braking system for vehicles, brake members, a fluid pressure system, means responsive to the pressure therein for operating said brake members, means for providing fluid under pressure, an outlet for said fluid under pressure, said pressure providing means comprising a high pressure cylinder arranged to have constant communication with said outlet, a low pressure cylinder arranged to normally have communication with said outlet, pistons in said cylinders, means for causing said pistons to enter said cylinders simultaneously to force the fluid from said cylinders, a fluid reservoir, a pair of valves controlled by the pressure in said outlet, said valves being so arranged that when one is seated the other is off its seat, one of said valves serving to establish communication between the said low pressure cylinder and said fluid reservoir, the other of said valves serving to limit the communication of the high pressure cylinder to said outlet.

10. In a braking system for vehicles, brake members for engaging the brake drums of the wheels, a fluid pressure system and means responsive to the pressure therein for operating said brake members, a device for creating pressure in said system comprising a high pressure producing means, a low pressure producing means and means responsive to predetermined pressures in said system for opening and closing communication between said system and said low pressure producing means.

11. In a braking system for vehicles, brake members for engaging the brake drums of the wheels, a fluid pressure system and means responsive to the pressure therein for operating said brake members, a device for creating pressure in said system comprising a high pressure producing means continually in communication with said system, a low pressure producing means normally in communication with said system, and means operable at a predetermined pressure in said system for cutting off said low pressure producing means from communication with said system.

12. In a braking system for vehicles, brake members for engaging the brake drums of the wheels, a fluid pressure system and means responsive to the pressure therein for operating said brake members, a device for creating pressure in said system comprising a high pressure producing means arranged to force a small volume of fluid into said system, under high pressure, a low pressure producing means arranged to force a large volume of fluid into said system under low pressure, said high and low pressure producing means being arranged upon initial operation to both force fluid into said system, and a pair of mechanically connected valves operable at a predetermined pressure in said system for closing communication between said system and said low pressure producing means, and limiting communication of the high pressure producing means to said system.

13. In a braking system for vehicles, brake members for engaging the brake drums of the wheels, a fluid pressure system and means responsive to the pressure therein for operating said brake members, a device for creating pressure in said system comprising means for initially injecting a large volume of fluid into said system, means operable by a predetermined pressure in said system for closing communication between said system and said first-mentioned means, and means for thereafter injecting a small volume of fluid under high pressure into said system.

14. In a braking system for vehicles, brake members for engaging the brake drums of the wheels, a fluid pressure system and means responsive to the pressure therein for operating said brake members, a device for creating pressure in said system comprising a high pressure producing means arranged to force a small volume of fluid into said system under a high pressure, a low pressure producing means arranged to force a comparatively large volume of fluid into said system under a relatively low pressure, said high and low pressure producing means being arranged upon initial operation to both force fluid into said system, a fluid reservoir, means operable by a predetermined pressure produced in said system for closing communication between said system and said low pressure producing means and opening communication between said low pressure producing means and said fluid reservoir, whereby said high pressure producing means is alone maintained in communication with said system, and means operable upon the reduction of pressure in said system for establishing communication between said fluid reservoir and said high and low pressure producing means, whereby fluid from said reservoir re-enters said pressure producing means to replenish the supply of fluid therein.

15. In a braking system for vehicles, brake members, a fluid pressure system, means responsive to the pressure therein for operating said brake members, and means for creating pressure in said system comprising a cylinder, a piston member within said cylinder spaced therefrom and secured thereto, said piston member being provided with an opening extending longitudinally thereof, a second cylinder arranged to slide in the space between said first-mentioned cylinder and said piston member and itself forming a piston, fluid within all the openings and spaces within the said cylinders and piston, means for causing movement of said second cylinder relative to said first-mentioned cylinder and piston member carried thereby, whereby said fluid is forced from said cylinders under pressure, an outlet for said fluid, a passage continually connecting said opening to said outlet, a second passage normally connecting said space to said outlet and means operated by a predetermined pressure in said passages and said outlet for closing the connection of said second passage to said outlet.

16. In a braking system for vehicles, brake members, a fluid pressure system, means responsive to the pressure therein for operating said brake members, and means for creating pressure in said system, comprising a cylinder, a piston member within said cylinder spaced therefrom and secured thereto, said piston member having an opening extending longitudinally thereof, a second cylinder arranged to slide in the space between said first-mentioned cylinder and said piston member and itself forming a piston, fluid within all the openings and spaces within the said cylinders and piston, means for causing movement of said second cylinder relative to said first-mentioned cylinder and piston member carried thereby, whereby said fluid is forced from said cylinders under pressure, an outlet for said fluid, a passage continually connecting said opening to said outlet, a second passage normally connecting said space to said outlet, a fluid reservoir and means operated by a predetermined pressure in said passages and said outlet for closing the connection of said passage to said outlet, and joining said second passage to said fluid reservoir.

17. In a braking system for vehicles, brake members, a fluid pressure system, means responsive to the pressure therein for operating said brake members, and means for creating pressure in said system comprising a cylinder, a piston member within said cylinder spaced therefrom and secured thereto, said piston member being provided with an opening extending longitudinally thereof, a second cylinder arranged to slide in the space between said first-mentioned cylinder and said piston member and itself forming a piston, fluid within all the openings and spaces within the said cylinders and pistons, means for causing movement of said last-mentioned cylinder relative to said first mentioned cylinder and piston member carried thereby, whereby said fluid is forced from said cylinders under pressure, an outlet for said fluid, a passage continually connecting said opening to said outlet, a second passage normally connecting said space to said outlet, a fluid reservoir, and a pair of valves operated by a predetermined pressure in said passages and said outlet for closing the connection of said second passage to said outlet, and joining it to said fluid reservoir.

18. In a braking system for vehicles, brake members, a fluid pressure system, means responsive to the pressure therein for operating said brake members, and means for creating pressure in said system comprising a cylinder, a piston member concentrically arranged within said cylinder spaced therefrom and secured thereto, said piston member being provided with an opening extending longitudinally thereof, a second cylinder arranged to slide in the annular space between said first-mentioned cylinder and said piston member and itself forming a piston, fluid within all the openings and spaces within the said cylinders and pistons, means for causing movement of said second cylinder relative to said first mentioned cylinder and piston member carried thereby, whereby said fluid is forced from said cylinders under pressure, an outlet for said fluid, a passage continually connecting said opening to said outlet, a second passage normally connecting said annular space to said outlet, a fluid reservoir, and a pair of valves operated by a predetermined pressure in said passages and said outlet for closing the connection of said second passage to said outlet and joining it to said fluid reservoir.

19. In a braking system for vehicles, brake members for engaging the brake drums of the wheels, a fluid pressure system, means responsive to the pressure therein for operating said brake members, a device for creating pressure in said system comprising a high pressure producing means, a low pressure producing means, and a valve for opening and closing communication between said system and said low pressure producing means, said valve being actuated responsive to changes in pressure above and below a predetermined pressure in the system.

20. A hydraulic braking system comprising hydraulically actuated brake-applying wheel cylinders, a liquid reservoir, a compressor including a master cylinder communicating with the wheel cylinders, retractile means therefor, operating independently of the back pressure from the wheel cylinders to replenish said master cylinder from the reservoir by suction, and valve means interposed between the compressor and the wheel cylinders for preventing a complete relief of the positive pressure in the wheel cylinders.

21. A hydraulic braking system comprising hydraulically actuated brake-applying wheel cylinders, retractile means therefor tending to create a positive pressure on the liquid therein, a liquid reservoir, a compressor including a master cylinder communicating with the wheel cylinders, retractile means therefor operating independently of the back pressure from the wheel cylinders to replenish the master cylinder from the reservoir by suction, and valve means interposed between the master cylinder and the wheel cylinders for preventing said suction on the former from relieving the positive back pressure in the latter.

In witness whereof, I hereunto subscribe my name this 23rd day of March, 1925.

MALCOLM LOUGHEAD.